July 18, 1961 R. W. MORGAN ET AL 2,992,560
LIQUID LEVEL GAUGE
Filed Nov. 14, 1956 2 Sheets-Sheet 2

INVENTORS
R. W. MORGAN
WARREN W. HASTINGS
CLARENCE A. MASS
BY
ATTORNEY

United States Patent Office 2,992,560
Patented July 18, 1961

2,992,560
LIQUID LEVEL GAUGE
Robert W. Morgan, Warren W. Hastings, and Clarence A. Mass, Rochester, N.Y., assignors, by mesne assignments, to American Radiator & Standard Sanitary Corporation, New York, N.Y., a corporation of Delaware
Filed Nov. 14, 1956, Ser. No. 622,160
4 Claims. (Cl. 73—317)

The present invention relates to gauges and more particularly to liquid-level gauges such as are employed on storage tanks for butane, propane, and other liquified petroleum gases. More specifically, the invention relates to a float-operated liquid-level gauge of the type in which the indicator is magnetically actuated.

Liquid level gauges of the character described are mounted on the storage tank with the float and the shaft, which is actuated thereby, disposed inside the tank and with the head, to which the indicating mechanism of the gauge is secured, bolted to a flange on the tank that surrounds the opening through which the float and the shaft are inserted into the tank. Sometimes the gauges are assembled to the tank at the point of installation of the tank. Frequently, however, the gauge is installed on the tank prior to shipment of the tank. Frequently, too, the gauge is mounted in the side of a tank, often horizontally. The tanks have often to be transported over rough roads and for long distances. Thus, if the gauge has been already installed on the tank, it is subjected to severe and prolonged vibration. Often, too, the tank is dropped off a truck at the point of installation without regard to the fact that the gauge itself is, as such, a delicate instrument. The indicating mechanism of the conventional gauge, moreover, when mounted on the head of the gauge, projects above the gauge head and may be struck and damaged; its crystal particularly is liable to breakage by rough handling or by accidental blows.

An object of the present invention is to provide a liquid-level gauge which is of more rugged construction than those now available and which is better able to withstand abuse.

Another and related object of the invention is to provide a novel, detachable indicator unit for a liquid level gauge that is specifically designed to have a rugged construction and to withstand rough handling.

Another and related object of the invention is to provide a gauge construction in which the indicating mechanism of the gauge is protected by the head of the gauge itself against damage.

Still another related object of the invention is to provide a gauge construction with which the window or crystal, that covers the indicating mechanism of the gauge, is protected against anything but a direct head-on blow.

Yet another object of the invention is to provide for a liquid-level gauge a removable indicator unit having means which insure its proper orientation with the float mechanism of the gauge.

Another object of the invention is to provide an improved mechanical connection between the tube or column, in which the actuating shaft of the gauge is housed, and the head of the gauge which will be especially resistant to deflection and distortion caused by rough handling or improper mounting.

Still another object of the invention is to provide a liquid-level gauge having an improved head design adapted for assembly on a tank and characterized by maximum resistance to the pressure of the gas confined within the tank, freedom from porosity, freedom from creep, and by light weight.

A further object of the invention is to provide an indicating mechanism for a dial gauge which has distinctive, clearly readable, dial graduations.

These and other objects of the invention which will be apparent hereinafter from the disclosure and from the recital of the appended claims are achieved by the gauge construction of this invention. To demonstrate the manner in which the invention fulfills these objects, a specific embodiment of the invention is described in detail hereinafter and is illustrated in the drawing.

In the embodiment of the invention illustrated in the drawing, the head of the gauge is formed, preferably by die-casting, with a thick section. It is recessed at its front to provide a cavity within which the indicator unit seats. It is formed at its rear with a rearwardly-extending tubular portion that receives snugly the tubular column or post within which the actuating or transmission shaft of the gauge is mounted. The column extends part way into the bore of the tubular portion of the head and the two are swaged together.

The indicator unit is of compact design and has a dished, backing plate of hollow, segmental spherical shape. The concave front surface of this backing plate is graduated. Mounted to project forwardly from this plate is a stud on which a disc magnet and an indicating pointer are rotatably mounted. The indicating end of this pointer is upturned to parallel, approximately, the front concave surface of the backing plate so as to permit easier reading against the graduations. A window or crystal made of tough, transparent plastic covers the front of the indicator unit. The plastic plate or crystal is held in place by a bezel which has a pair of diametrally opposed lugs that are of different shape, respectively. The lugs of the indicator unit seat in correspondingly shaped recesses on the front face of the gauge head; and the indicator unit is secured in place by screws which pass through these lugs and thread into the gauge. The indicator unit is mounted in the front depression or cavity in the gauge head so that the crystal lies flush with the front of the head or at least does not project beyond it. Thus, the thick wall of the gauge head surrounds the unit to guard it against accidental blows. In addition, the crystal is protected, against anything except a direct blow, by the heads of the bolts, which fasten the gauge head to the tank, and which protrude above the front face of the crystal.

A disc magnet is securely mounted on the transmission shaft in conventional fashion to transmit the motion of the transmission shaft to the magnet that is connected to the indicating pointer. Since the indicator unit is nested into the recess in the head, the two magnets are much closer to one another than in any previous gauge construction. Therefore the drive magnet is more efficient and can readily transmit torque to the driven magnet.

The remainder of the gauge construction is conventional, and includes a float which is secured to an arm and counter-balanced, and interconnected with the transmission shaft by gears to engage the shaft to rotate it in one direction or the other as the float moves up and down with change of level of liquid in the tank to which the gauge is secured.

By mounting the detachable indicator unit in a concave recess in the head of the gauge, the unit is surrounded, except on its window side, by the relatively thick walls of the gauge head, and is thus protected against damage. On the front face of the unit, the window is of exceptionally tough plastic material, and is protected against all except direct blows by the protruding heads of the bolts which fasten the gauge to the tank body. The tubular portion, which extends rearwardly from the rear face of the gauge head, provides a bridge-like support or joint between the column and the head and reduces deflection of the gauge caused by externally applied forces such as may occur in shipping or in the fabricator's shop. The different contours of the tabs or lugs which extend from the chamber unit and which seat in correspondingly contoured recesses in the gauge head insure proper orientation between the graduated dial face of the indicator unit and the float mechanism.

The details of the invention may be best understood by reference to the following description, taken together with the drawings, in which.

Figure 3:
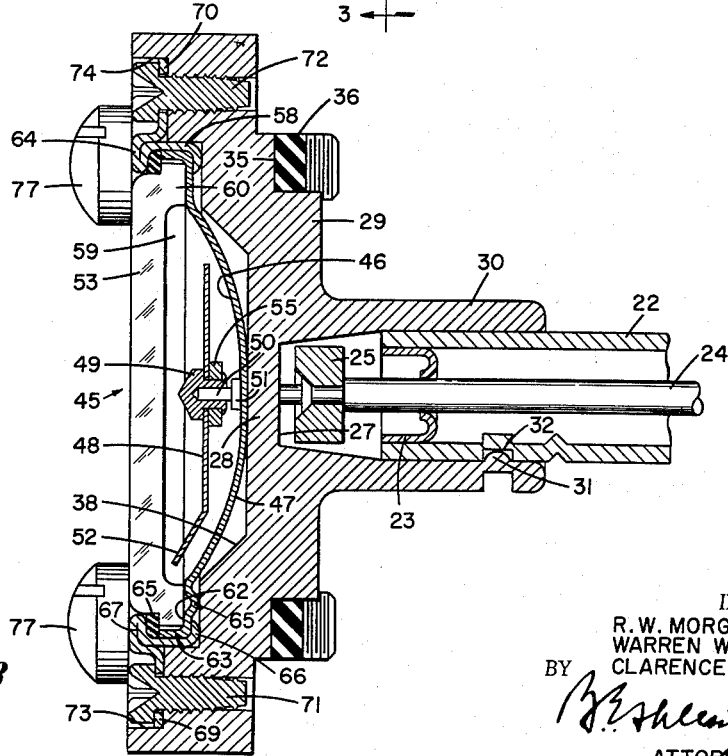
FIG. 3 is a fragmentary section, on the scale of FIG. 2, taken on line 3—3 of FIG. 2 looking in the direction of the arrows.

Referring now in detail to the drawings, the actuating mechanism of the gauge comprises a float 10 which is secured to one end of an arm 11, to the opposite end of which is connected a counterweight 12. The arm 11 is pivoted by means of a clip or plate 14 on a stud 15. The plate is attached to a gear segment 16 that is protected on one side by a shroud 17 and that meshes with a spur gear 18. The stud 15 is secured against rotation in the furcations of a yoke 20. The yoke has two diametrically opposed upturned tongues 21 which are welded or otherwise secured to a supporting post or column 22. The gear 18 is fastened to a shaft 24. This shaft is journaled at its lower end in the stud or bar 15. It extends upwardly through a hole in the yoke 20, and is journaled at its upper end in a bearing member 23 coaxially within the column or tube 22. Secured to it adjacent its upper end is a disc magnet 25 (FIG. 3).

The head 29 of the gauge is formed with a tubular portion 30 extending rearwardly from the rear face thereof, and the front end of column or tube 22 is seated in the bore of this tubular portion 30 in axially spaced relation to the front end 27 of the tubular portion 30. The magnet 25 is disposed adjacent the front end 27 of the bore of the tubular portion; and the magnet 25 is mounted as close to the front end 27 of the bore as practicable. The column 22 is secured within the cylinder 30 by a swaged joint at which the dimple 31 on the cylinder extends inwardly into an aperture 32 in the column.

The head 29 has on its rear surface an annular shoulder 35 on which is mounted a neoprene gasket 36.

Figure 1:
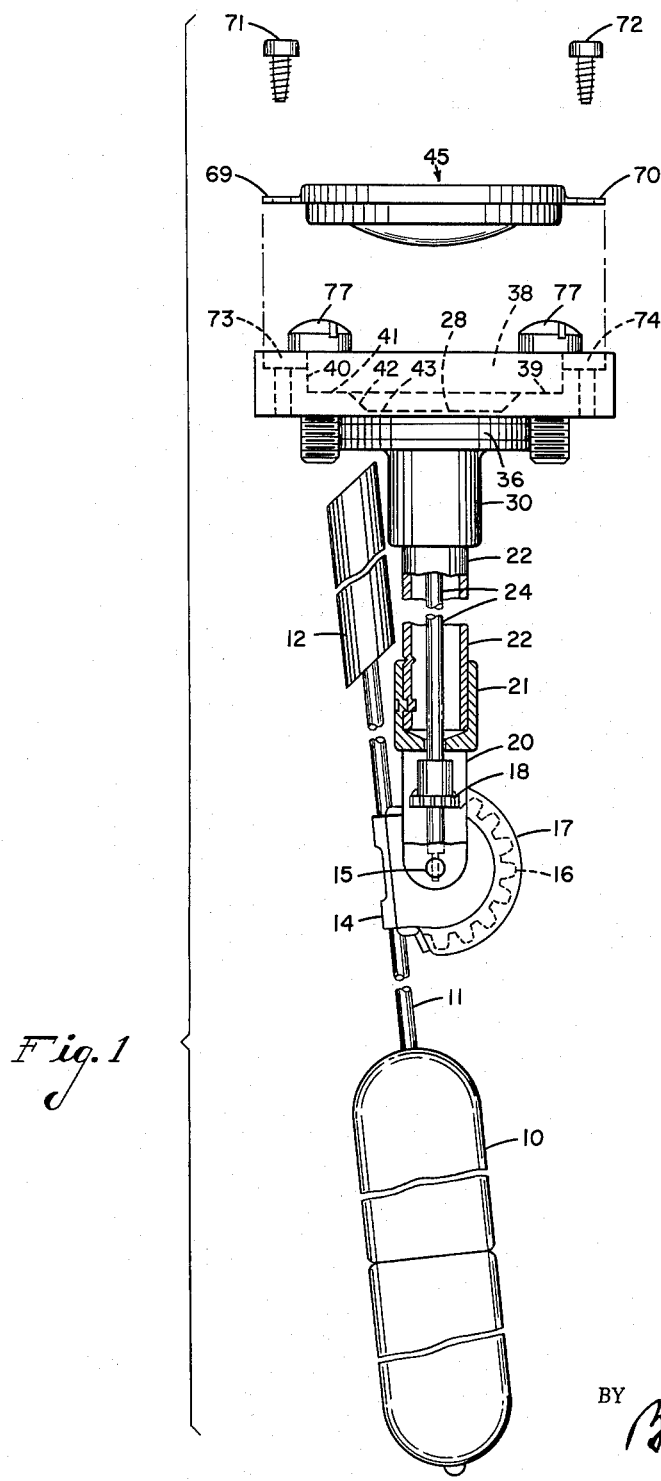
FIG. 1 is an exploded side elevation, partly broken away, of a gauge constructed according to one embodiment of this invention, showing some of the parts of the indicator unit disassembled but in their relative positions in the assembly.

On its front, the head 29 has a dished depression or cavity 38 to receive the indicator unit 45. This cavity is formed by a cylindrical recess 39 (FIG. 1) in the head that has a wall 40 and which terminates in a plane shoulder 41, and that connects with a truncated conical recess 42 which terminates in plane surface 43. The head is of reduced thickness in the portion 28 thereof that extends between the front end 27 of the bore of the rearwardly extending tubular portion 30 and the plane surface 43, so that the flux of the magnet 25 need penetrate only a minimum thickness of metal. A pair of diametrically-opposed, shaped shallow recesses 73 and 74 extend radially from the concavity 38.

The removable indicator unit 45 is enclosed and self-contained. The dial 46 of this unit is formed by graduations placed on the front face of the back 47 of this unit. The back 47 is generally cup-shaped. Its central portion is of segmental hollow spherical shape. This hollow spherical portion is received in the truncated conical part of the recess 38 of the gauge head; and this hollow spherical portion is surrounded by an annular flat flange 62 which is enclosed by the cylindrical edge marginal wall 63 of the back. The flange 62 is adapted to be disposed in front of the plane shoulder 41 of the recess in the head; and the cylindrical wall 63 seats within the cylindrical wall 40 of the recess. A dimple or elongated depression 65 is provided in back 47 for use in assembling the pointer 48 in proper angular relation to the graduations of the dial 46. Projecting forwardly from this backing member is a post or stud 50. Journaled on this post or stud is a hub member 49 to which is secured a needle or pointer 48 and the disc magnet 55.

The indicator pointer 48 has an upturned end portion 52 which roughly parallels the front dial surface of the back 47 and facilitates reading of the gauge. The disc magnet 55 cooperates with the disc magnet 25, when the indicator unit is mounted in the head of the gauge, to transmit the motion of the float arm 11 to the pointer 48.

The indicator chamber is enclosed by a window or crystal 53 of polymerized methyl methacrylate, or a similar tough material, formed with a circular recess 59 on its rear surface into which the upturned end 52 of the pointer extends. The recess 59 provides an annular flange or ring 60 which seats against the flat radial flange 62 of the back 47. The crystal 53 is secured in place by a bezel 64. Bezel 64 is formed with an annular skirt 58 that surrounds the wall of the back 47, and with an inturned portion 66 that engages under back 47 to lock the bezel in place. At its front the bezel has a circular flange 67 formed by reversely bending the bezel. This flange extends over the front edge of the back 47 and the marginal edge of the front face of the crystal 53. The crystal is locked in place by a gasket 65 that is interposed between the flange 67 of the bezel and the front edge of the back 47 and the marginal edge of the front face of the crystal. A pair of radially-extending lugs, 69 and 70 respectively, are formed at diametrically opposed locations on the bezel and are of different configurations.

The shaped apertures 73 and 74 in the head 29 receive the correspondingly shaped lugs or tabs 69 and 70. The indicator unit 45 is secured on the head of the gauge by a pair of self-tapping screw fasteners 71 and 72, respectively, which pass through apertures in the lugs 69 and 70 and which thread into the head 29.

Figure 2:
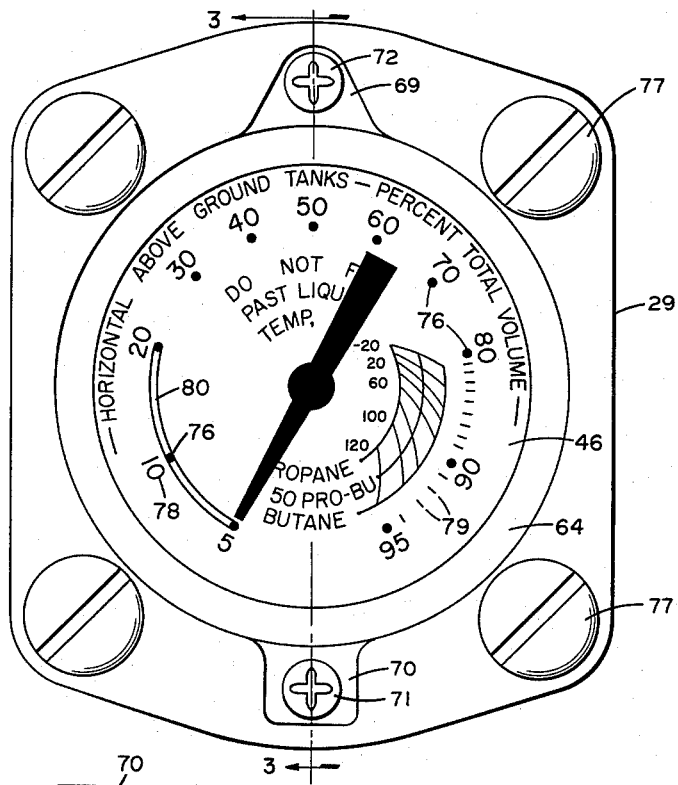
FIG. 2 is a top plan view of the assembly gauge on a greatly enlarged scale.

The indicator dial 46 is graduated on its face so that the pointer 48 can indicate the level of liquid in the tank with which the gauge is used. The graduations indicate the percentage of liquid in the tank as compared to the total volume. Instead of using graduation lines, the major graduations on the scale are denoted by the dots 76 (FIG. 2) and appropriate numerals 78. It is only in the subdivisions of the scale that graduation lines, such as 79 are used. This arrangement makes for easier legibility. In that portion of the dial indicating a liquid content of 20% of total volume or lower, a red zone 80 is imprinted to indicate a dangerously low liquid content in the tank. The dot graduations 76 are black and are imprinted over the red zone 80. The background of the dial is preferably white.

The indicator unit 45 may readily be removed from the gauge body by removal of the screw fasteners 71 and 72. When the unit is replaced, the different configurations of the lugs 69 and 70 and their respective recesses 73 and 74 in the head 29 insure proper orientation between the graduated dial 46 and the float 10.

The gauge can be secured in a tank by screws or bolts 77 that pass through holes in the head 29. Since the whole of the indicating unit is disposed within the recess 38 in the head, it is protected by the head; and since the front face of the crystal 53 is flush with the front face of the head, the heads of the bolts 77 necessarily project forwardly beyond the crystal, thereby forming auxiliary protection for the crystal. Only a direct head-on blow can damage the crystal, therefore. Moreover, the window or crystal 53 is of extraordinary tough plastic and is not readily fracturable.

With the structure of the present invention the screws or bolts are readily accessible at all times. Thus, the indicator unit is accessible for easy removal or placement even in the cramped quarters usually experienced in gauge mountings of liquified petroleum gas tanks. However, the indicator unit need not be removed in order to remove the gauge from the tank.

The gauge operates when assembled in conventional manner. As the float arm moves up or down with change of level of liquid in the tank, the segment 16 rotates the gear 18 and the shaft 24 in one direction or the other, rotating the magnet 25 correspondingly. Movement of the magnet 25 causes rotation of the magnet 55 and pointer 48 to read against the graduations of the dial 46.

While a variety of non-magnetic metallic materials may be employed for the head 29, such as die cast zinc, or stainless steel, the preferred metal is a dense aluminum alloy cast at extremely high casting pressure to insure maximum density. Such a cast gauge head is free from porosity so that no gas can escape through the head, is free from creep, and has exceptional strength characteristics. The engagement between the tubular portion 30 of the head and the column 22 which is seated therein and the portion 28 of the head, which bridges the tubular portion 30 of the head, aids the tubular portion 30 of the head to resist deflection and thereby helps the tubular column 22 to resist deflection under load during assembly or shipping, and even when deflected under load, to resist permanent set.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A gauge comprising a head formed with an integral rearwardly projecting tubular portion on its rear surface, a tubular column mounted and secured in said tubular portion and axially spaced from the front end thereof, the confronting wall surfaces of said column and tubular portion engaging each other, a condition-responsive member movably mounted on said portion, a magnet connected to said condition-responsive member to move upon movement of said member and mounted in the end of said tubular portion adjacent the rear surface of the head, an enclosed indicator unit comprising an indicator dial, an indicator pointer, one of which is movable in said unit by magnetic attraction on movement of said magnet, a transparent window member closing said unit, and a bezel holding the window member in position, said unit being mounted on said head, and means to locate said indicator unit angularly in one predetermined position relative to the head and to hold one against rotation relative to the other including at least two lugs of different shapes on said bezel, said head being provided with corresponding recesses in which said lugs are engaged.

2. A gauge comprising a head having a recess on its front surface, a condition-responsive member movably mounted relative to said head, a magnet connected to said condition-responsive member to move upon movement of said member, an enclosed indicator unit comprising an indicator dial, an indicator pointer, one of which is movable in the unit by magnetic attraction on movement of said magnet, a transparent window member closing said unit, and a bezel holding the window member in position, said unit being mounted within said recess with the window member exposed at its front, means to locate said indicator unit angularly in one predetermined position relative to the head and to hold one against rotation relative to the other including at least two lugs of different shapes on said bezel, said head having correspondingly-shaped recesses in which said lugs are engaged, and means on said head protruding above the surface of said head and above the surface of said window member to guard said window member.

3. A gauge adapted to be secured in the wall of a container and comprising a head having a generally concave recess on its front, a marginal flange on said head surrounding said recess, a condition-responsive member movably mounted relative to said head, a drive magnet connected to said condition-responsive member to move upon movement of said member, an enclosed indicator unit comprising an indicator dial, an indicator pointer, one of which is movable in the unit by magnetic attraction by movement of said drive magnet, a transparent window member closing said unit, and a bezel holding the window member in position, at least two lugs of different shapes extending radially outward from said bezel, said flange having two correspondingly-shaped recesses, said lugs being mounted in said recesses to locate said unit angularly relative to said condition-responsive member, said drive magnet being positioned in close proximity to the rear surface of said head and to said indicator unit, and a bolt mounted in the flange of said head to secure said gauge to the wall of a container, the head of said bolt extending upwardly above the surface of said head and said window member of the indicator unit.

4. A gauge adapted to be secured to the wall of a container and comprising a head formed with a rearwardly projecting tubular portion on its rear surface, said head having a recess on its front surface, a tubular column inserted and secured in the bore of said tubular portion with its wall engaging the confronting wall of said portion, said tubular portion and tubular column being secured together against rotation relative to each other, a condition-responsive member movably mounted in said tubular column, a magnet connected to said condition-responsive member to move upon movement of said member, said magnet being mounted adjacent the end of the bore of said tubular portion in close proximity to the rear surface of said head, an enclosed indicator unit comprising an indicator dial, an indicator pointer, one of which is movable in the unit by magnetic attraction on movement of said magnet, a transparent window member closing said unit, and a bezel holding the window member in position, said unit being mounted within said recess with the window member exposed at its front, at least two lugs of different shapes extending radially outward from said bezel, said flange having two correspondingly-shaped recesses, said lugs being seated in said recesses to locate said indicator unit angularly on the head and to hold the indicator unit against rotation relative to the head, and a bolt mounted in the flange of said head to secure said gauge to the wall of a container, said bolt having a head which protrudes above the surface of said window member of said indicator unit.

References Cited in the file of this patent

UNITED STATES PATENTS

| | | |
|---|---|---|
| 1,141,499 | Stahle | June 1, 1915 |
| 1,170,910 | Kean | Feb. 8, 1916 |
| 2,091,952 | Bandoly | Sept. 7, 1937 |
| 2,311,387 | Hastings | Feb. 16, 1943 |
| 2,584,446 | Hastings | Feb. 5, 1952 |
| 2,718,869 | Young | Sept. 27, 1955 |
| 2,773,388 | Prosser | Dec. 11, 1956 |
| 2,795,955 | Hall | June 18, 1957 |